(12) United States Patent
Gao et al.

(10) Patent No.: US 12,465,897 B1
(45) Date of Patent: Nov. 11, 2025

(54) PRODUCTION PROCESS, EQUIPMENT AND SYSTEM FOR FACTORY-MIXED WARM AND HOT RECYCLED ASPHALT MIXTURE

(71) Applicants: Ordos Lutai New Materials Technology Development Co., Ltd., Ordos (CN); Ordos Lutai Highway Engineering Co., Ltd., Ordos (CN)

(72) Inventors: Zhong Gao, Ordos (CN); Zhibao Luo, Ordos (CN); Feixiang Gao, Ordos (CN); Feilin Gao, Ordos (CN)

( * ) Notice: Subject to any disclaimer, the term of this patent is extended or adjusted under 35 U.S.C. 154(b) by 0 days.

(21) Appl. No.: 19/254,687

(22) Filed: Jun. 30, 2025

(30) Foreign Application Priority Data

Aug. 19, 2024 (CN) .......................... 202411137664.2

(51) Int. Cl.
| | |
|---|---|
| *B01F 23/60* | (2022.01) |
| *B01F 29/80* | (2022.01) |
| *B01F 33/80* | (2022.01) |
| *B01F 35/21* | (2022.01) |
| *B01F 35/71* | (2022.01) |
| B01F 35/90 | (2022.01) |
| *B01F 101/38* | (2022.01) |

(52) U.S. Cl.
CPC .............. *B01F 23/69* (2022.01); *B01F 29/80* (2022.01); *B01F 33/8052* (2022.01); *B01F 33/8364* (2022.01); *B01F 35/2113* (2022.01); *B01F 35/2115* (2022.01); *B01F 35/71705* (2022.01); *B01F 35/71731* (2022.01); *B01F 2035/99* (2022.01); *B01F 2101/38* (2022.01)

(58) Field of Classification Search
CPC . B01F 2101/38; B01F 35/214; B01F 2035/99
See application file for complete search history.

(56) References Cited

U.S. PATENT DOCUMENTS

| | | | | |
|---|---|---|---|---|
| 2008/0259714 | A1* | 10/2008 | Brock | ................. E01C 19/1045 366/24 |
| 2012/0325116 | A1* | 12/2012 | Ackerman | .............. C08L 95/00 106/277 |
| 2017/0306570 | A1* | 10/2017 | Crupi | ...................... B01F 33/27 |

FOREIGN PATENT DOCUMENTS

| | | |
|---|---|---|
| AU | 4084789 A | 3/1990 |
| CN | 109224898 A | 1/2019 |
| CN | 110540383 A | 12/2019 |
| CN | 219862205 U | 10/2023 |
| CN | 117758565 A | 3/2024 |

* cited by examiner

*Primary Examiner* — Anshu Bhatia

(57) ABSTRACT

A production process includes: feeding the recycled coarse aggregates and new aggregates into the hot recycled material drying drum simultaneously through the cold material bin for heating; adding the recycled fine aggregates to the mixing cylinder of the cold recycled material mixer through the existing cold addition system for recycled materials, and then being mixed and stirred with the recycling agent after dry mixing for a certain period of time, and placing the oil-rich fine aggregates in the cold recycled material batching machine and conveyed to the cold recycled material hoist through a conveyor belt.

3 Claims, 2 Drawing Sheets

PRODUCTION PROCESS, EQUIPMENT AND SYSTEM FOR FACTORY-MIXED WARM AND HOT RECYCLED ASPHALT MIXTURE

CROSS-REFERENCE TO RELATED APPLICATIONS

The present application claims priority to a Chinese patent application No. 202411137664.2, titled "Production process, equipment and system for factory-mixed warm and hot recycled asphalt mixture", filed on Aug. 19, 2024, the entire contents of which are incorporated herein by reference.

TECHNICAL FIELD

The present application relates to the technical field of recycled materials, and in particular, to a production process, equipment and system for factory-mixed warm and hot recycled asphalt mixture.

BACKGROUND

The asphalt pavement is a kind of advanced pavement widely used in road construction. The asphalt pavement includes various types of road surfaces formed by paving and compacting asphalt concrete. Asphalt concrete is a mixture formed by fully mixing asphalt materials with a certain viscosity and appropriate dosage with mineral aggregates of a certain gradation. As a material for asphalt pavements, asphalt concrete has to withstand the repeated effects of the loads of driving vehicles and the long-term influence of environmental factors during its service life. Therefore, while having a certain bearing capacity, asphalt concrete must also possess good durability to resist the effects of natural factors. That is to say, it should be able to exhibit characteristics such as sufficient stability in high-temperature environments, crack resistance in low-temperature conditions, good water stability, lasting anti-aging properties, and safe anti-skid properties, etc., to ensure the good service functions of the asphalt pavement.

The asphalt binder improves the ability of the granular materials used for paving to resist the damage to the pavement caused by driving vehicles and natural factors, making the pavement smooth, less dusty, impervious to water, and durable. Asphalt pavements have a high recycling value after being damaged. After the old asphalt pavement is excavated, recycled, crushed, and screened, it is re-mixed with a rejuvenator, new asphalt materials, new aggregates, etc. in a certain proportion to form a mixture. However, in the existing technology, the higher the proportion of recycled materials, the greater the dosage of the rejuvenator, and the longer the required heating time, and it will increase the emissions of harmful gases and dust, which not only causes harm to the health of construction operators but also pollutes the atmosphere. In the hot recycling technology, the low proportion of recycled materials and the high mixing temperature limit the popularization and application of this technology. In addition, during the heating process of recycled materials, there is also a lack of effective control over energy, which makes it impossible for the heating process to reach the optimal state, and may thus affect the final performance and quality of the recycled materials.

In view of this, the present application provides a production process, equipment and system for factory-mixed warm and hot recycled asphalt mixture to solve the above technical problems existing in the related art.

SUMMARY

Based on the technical problems existing in the background art, the present application proposes a production process, equipment and system for factory-mixed warm and hot recycled asphalt mixture.

The present application proposes a production process for factory-mixed warm and hot recycled asphalt mixture with a large proportion of recycled materials, which comprises the following steps:

Step 1: Simultaneously feeding 10%-50% of the recycled coarse aggregates and new aggregates through the cold material bin into the hot recycled material drying drum, and heat them to 200° C.

Step 2: Adding 20%-30% of the recycled fine aggregates to the mixing cylinder of the cold recycled material mixer through the existing cold addition system for recycled materials, and after dry-mixing for a certain period of time, mixing and stirring them with the recycling agent.

Step 3: Placing 20%-30% of the oil-rich fine aggregates in the cold recycled material batching machine, and conveying them to the cold recycled material hoist via a conveyor belt, then lifting them to the cold recycled material temporary storage hopper, and after weighing in the cold recycled material weighing hopper, conveying them to the mixing cylinder of the mixer through the cold recycled material chute.

Step 4: Simultaneously feeding 10%-50% of the recycled coarse aggregates and new aggregates through the cold material bin into the hot recycled material drying drum, and heating them to 200° C., screening them through a vibrating screen, weighing them according to the mixing ratio, and then sending them into the mixing cylinder of the mixer, and after dry-mixing for a certain period of time, mixing and stirring them with asphalt to produce the finished recycled asphalt mixture.

Or including the following steps:

Step 1: Feeding 30%-50% of the recycled coarse aggregates through the hot recycled material batching machine and a belt conveyor into the counter-flow heated hot recycled material drying drum, heating the recycled coarse aggregates to above 120° C. in the hot recycled material drying drum, heating the new aggregates to 200° C. in the same hot recycled material drying drum, screening them through a vibrating screen, weighing them according to the mix proportion, and sending them into the mixing cylinder of the mixer.

Step 2: Simultaneously feeding the recycled coarse aggregates heated to 120° C. and the new aggregates heated to 200° C. into the mixing cylinder of the mixer, and adding part of the asphalt for pre-coating.

Step 3: Placing 20%-30% of the oil-rich fine aggregates in the cold recycled material batching machine, conveying them through a belt to the cold recycled material heater for pre-heating to 80° C., lifting them by the cold recycled material hoist to the cold recycled material temporary storage hopper, after weighing in the cold recycled material weighing hopper, and sending them into the cold recycled material mixer for pre-mixing with the recycling agent.

Step 4: Subsequently, weighing all the aggregates proportionally, and then letting them enter the mixing cylinder of the mixer through the chute, and mixing them with the remaining asphalt to complete the mixing process and produce the finished recycled asphalt mixture.

In one embodiment, in the first step, when the addition amount of the recycled materials is 50%-60%, the hot-mixing method is adopted; when it is more than 60%, pre-heating by the warm-mixing method is adopted.

In one embodiment, the recycled materials are obtained by recycling the old asphalt mixture pavement materials through methods such as milling or mechanical excavation, and then finely separating them through the processes of dust removal, flexible dispersion, primary screening, primary crushing, secondary crushing, asphalt film removal, and fine screening; one type of fine aggregate is obtained through primary screening, and 3-5 types of coarse aggregates and one type of oil-rich fine aggregate are obtained through fine screening.

A production system for factory-mixed warm and hot recycled asphalt mixture is applied to a production equipment of factory-mixed warm and hot recycled asphalt mixture, the production equipment includes a main mixer, a hot recycled material chute, a cold recycled material chute, a hot recycled material weighing hopper, a hot recycled material temporary storage hopper, a cold recycled material mixer, a cold admixture weighing hopper, a cold admixture temporary storage hopper, a cold recycled material elevator, a hot recycled material scraper conveyor, a rejuvenator platform, a first hot recycled material elevator, a flue gas treatment device, a second hot recycled material elevator, a cold admixture heater, a combustion hot air system, and a hot recycled material drying drum mounted in a region of an equipment building frame; and a cold admixture batching machine and a hot recycled material batching machine provided on a ground;

the hot recycled material chute and the cold recycled material chute are respectively mounted above the main mixer, and the hot recycled material weighing hopper and the hot recycled material temporary storage hopper are sequentially mounted above the hot recycled material chute, and the cold recycled material mixer, the cold admixture weighing hopper and the cold admixture temporary storage hopper are sequentially mounted above the cold recycled material chute;

materials of the cold admixture batching machine are conveyed to the cold admixture heater through a conveyor belt, and the cold admixture heater conveys the materials to the cold admixture temporary storage hopper through the cold recycled material elevator, and the rejuvenator in the rejuvenator platform is added to the cold recycled material mixer through an addition system;

the hot recycled material drying drum is provided between the second hot recycled material elevator and the first hot recycled material elevator, a temperature of the hot recycled material drying drum is controlled by the combustion hot air system, and an outlet of the first hot recycled material elevator is provided at the inlet of the hot recycled material scraper conveyor, and the materials of the hot recycled material batching machine are conveyed to the second hot recycled material elevator through a conveyor belt.

A production system for factory-mixed warm and hot recycled asphalt mixture also includes a communication module, a user access module, and a data storage module;

the data storage module is configured to store the temperature data of the cold admixture heater and the hot recycled material drying drum, and the heating signals and the corresponding number of heating units;

the user access module is configured to access the information stored in the data storage module;

the communication module is configured to realize the data synchronization among the sensor module, the logic control module, and the actuator module.

In one embodiment, the temperature data and pressure data are received for analysis and processing in real time, specifically:

the cold recycled material heater includes several heating units, obtaining the heating temperature of the heating units, calculating an average value of the heating temperatures of all the heating units to obtain a heating average value; setting a temperature monitoring time zone, and preprocessing the heating average value at any collection moment within the temperature monitoring time zone, wherein the preprocessing comprises calculating the average value, variance, and range, and the preprocessed value is normalized to obtain a heating value;

obtaining the temperature at a set position inside the hot recycled material drying drum, and preprocessing a temperature at any collection moment within the temperature monitoring time zone, and normalizing the preprocessed value to obtain a drum temperature value JW2;

performing a weighted calculation of the heating value and the drum temperature value to obtain the temperature adjustment value; comparing the temperature adjustment value with any threshold in the preheating temperature threshold group comprises:

If $0 \leq JW < Ja$, generating a low-power heating signal;
If $Ja \leq JW < Jb$, generating a conventional heating signal;
If $Jb \leq JW < Jc$, generating a high-power heating signal;

marking the low-power heating signal, the conventional heating signal, and the high-power heating signal as the heating signal group;

using a formula: $Q = m \cdot c \cdot \Delta T$; calculating the heat energy required to heat the materials from a current temperature to a required temperature, and obtaining a mass flow rate, a specific heat capacity, and a temperature change of the materials; wherein Q represents the required heat energy, m represents the mass flow rate of the materials, c represents the specific heat capacity, and $\Delta T$ represents the difference between the current temperature and the required temperature; adjusting the required heat load according to the actual efficiency, and the formula is expressed as: $P = Q/\eta$, to obtain the required total power P; $\eta$ is a thermal efficiency of the heater;

obtaining a rated power p of any heating unit in the cold admixture heater;

calculating by a formula $ni = P/p \times ki$ according to the rated power and the total power, to obtain the determined number ni of heating units that need to be turned on; wherein k represents the weight coefficient of the corresponding heating signal in the heating signal group, and i represents the numbers of the low-power heating signal, the conventional heating signal, and the high-power heating signal, expressed as i=1, 2 or 3.

In one embodiment, the system also includes a communication module, a user access module, and a data storage module;

the data storage module is configured to store the temperature data and the heating signals of the cold admixture heater and the hot recycled material drying drum, and the corresponding number of heating units;

the user access module is configured to access the information stored in the data storage module;

the communication module is configured to realize the data synchronization among the sensor module, the logic control module, and the actuator module.

Compared with the related art, the present application provides a production process, equipment and system for factory-mixed warm and hot recycled asphalt mixture, which have the following beneficial effects:

1. In the present application, when the total proportion of recycled materials in the mixture is 25% to 40%, it is suitable for various types of mixtures and layers. By separately heating and adding the recycled coarse aggregates using a recycling drum, and the recycled fine aggregates are preheated and added through a dedicated addition system, the performance of the asphalt mixture is further improved, and the total proportion of recycled materials can reach 50% to 80%, thus improving the application efficiency of recycled materials. The rejuvenator is added to the recycled material mixer through the addition system and pre-mixed with the recycled fine aggregates in the recycled material mixer. Since the pre-mixing process of the recycled fine aggregates and the rejuvenator is added, the performance of the asphalt mixture is further enhanced, and the total proportion of recycled materials can reach 50% to 80%, improving the application efficiency of recycled materials.

2. The present application conducts a detailed analysis and processing of the temperatures of the cold recycled material heater and the hot recycled material drying drum, and dynamically adjusts the operating status and quantity of the heating units according to real-time data, the energy utilization efficiency is improved, thereby avoiding energy waste, realizing precise control of the heating process, and ensuring that the temperature is always within an appropriate range, which is helpful for improving the product quality.

DETAILED DESCRIPTION OF THE EMBODIMENTS

Figure 1:
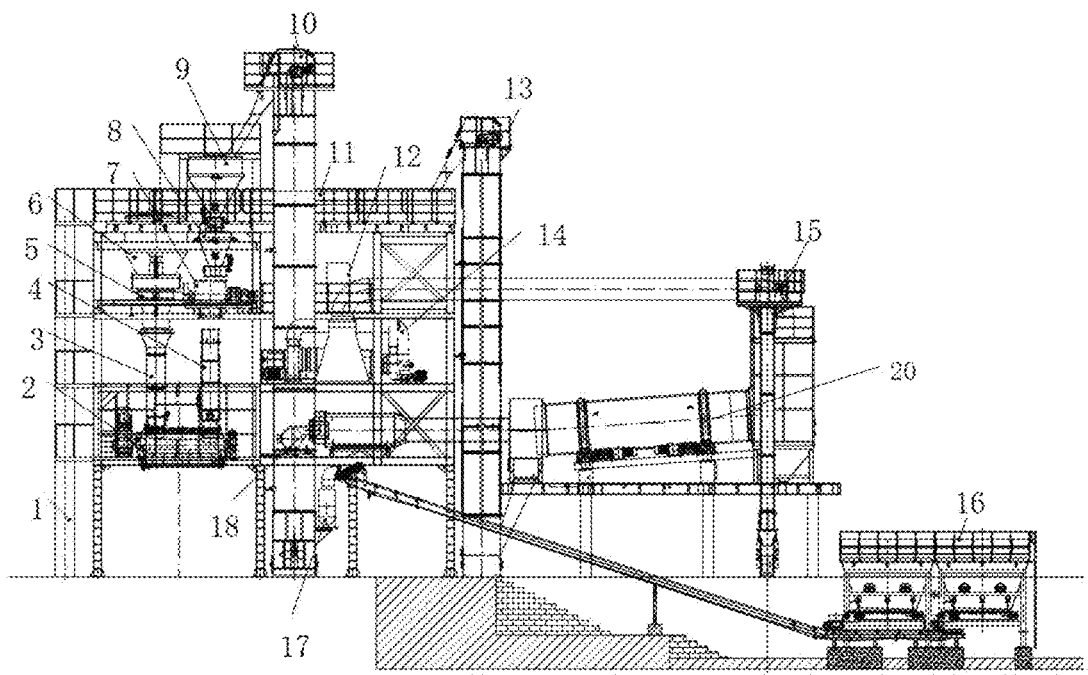
FIG. 1 is a schematic structural diagram of the production equipment for factory-mixed warm and hot recycled asphalt mixture with a large proportion of recycled materials proposed by the present application.

The embodiments of the present application will be described in detail below. Examples of the embodiments are shown in the accompanying drawings, in which the same or similar reference numerals represent the same or similar elements or elements with the same or similar functions throughout. The embodiments described below with reference to the accompanying drawings are exemplary and are only used to explain the present application, and should not be construed as limiting the present application.

The First Embodiment

A production process for factory-mixed warm and hot recycled asphalt mixture with a large proportion of recycled materials includes simultaneously feeding 10% to 50% of the recycled coarse aggregates from the cold material bin and the new aggregates into the hot recycled material drying drum 20 for heating to 200° C., and adding 20% to 30% of the recycled fine aggregates to the mixing cylinder of the cold recycled material mixer 7 through the existing cold addition system for dry-mixing for a certain period of time and then being mixed and stirred with the rejuvenator.

Secondly, 20% to 30% of the oil-rich fine aggregates are placed in the cold recycled material batching machine 16, conveyed to the cold recycled material elevator 10 by a belt conveyor, lifted to the cold recycled material temporary storage hopper 9, weighed by the cold recycled material weighing hopper 8, and then conveyed to the mixing cylinder of the mixer 2 through the cold recycled material chute 4.

The 10% to 50% of the recycled coarse aggregates and the new aggregates simultaneously enter the hot recycled material drying drum 20 from the cold material bin and are heated to 200° C. After being screened by a vibrating screen and weighed according to the mix proportion, they enter the mixing cylinder of the mixer 2. After dry-mixing for a certain period of time, they are mixed and stirred with asphalt. The ex-factory temperature of the finished recycled asphalt mixture is between 140° C. and 180° C.

The mixing process of the recycled asphalt concrete adopts the mixing method of the existing factory-mixed hot recycling equipment. The total proportion of the recycled materials is 25% to 40%, which is suitable for various types of mixtures and layers.

Technical Indicators of the Asphalt Mixture Corresponding to Example 1

| Test Items | Unit | Technical Requirements | Measured Indicators |
|---|---|---|---|
| Dimensions of the Test Specimen | mm | φ101.6 mm × 63.5 mm | — |
| The number of compaction blows for Marshall test specimen (both sides) | times | 75 | — |
| Void ratio | % | 3~5 | 4 |
| Percentage of voids in mineral aggregate, not less than | % | 12.5 | 13.1 |
| Stability (MS), not less than | kN | 8 | 10.02 |
| Flow value (FL) | mm | 2~4.5 | 3.12 |
| Percentage of voids filled with asphalt (VFA) | % | 65~75 | 69.6 |
| Residual stability of the immersed Marshall test, not less than | % | 75 | 86.7 |
| Residual strength ratio of the freeze-thaw splitting test, not less than | % | 70 | 89.9 |
| Dynamic stability of rutting, not less than | Time/mm | 800 | 1254 |
| Failure strain of the low-temperature bending test | με | 2300 | 2709.7 |
| Asphalt-aggregate ratio | % | 4.5 | 4.5 |
| Asphalt-aggregate ratio of newly added asphalt | % | 3.6 | 3.6 |
| Mixing proportion of reclaimed asphalt pavement (RAP) material | % | — | 30 |

The Second Embodiment

A production process for factory-mixed warm and hot recycled asphalt mixture with a large proportion of recycled materials includes heating 30% to 50% of the recycled coarse aggregates to above 120° C. in the hot recycled material drying drum 20, preheating 20% to 30% of the recycled fine aggregates to 80° C. and mixing and stirring them with the new aggregates. When the addition amount of the recycled materials is 50% to 60%, the hot mixing method is adopted, and when it is greater than 60%, the warm mixing method is adopted.

The 30% to 50% of the recycled coarse aggregates are fed into the counterflow-heated hot recycled material drying drum 20 through the hot recycled material batching machine 19 and the belt conveyor. They are heated to above 120° C. in the hot recycled material drying drum 20, lifted to the hot recycled material scraper conveyor 11 by the first hot recycled material elevator 13, and conveyed to the hot recycled material temporary storage hopper 6 through the hot recycled material scraper conveyor 11. After being weighed by the weighing system according to the mix proportion, they enter the mixing cylinder of the mixer 2 through the chute.

The 20% to 30% of the oil-rich fine aggregates are placed in the cold recycled material batching machine 16, conveyed to the cold recycled material heater 17 by the belt conveyor for preheating to 80° C., lifted to the cold recycled material temporary storage hopper 9 by the cold recycled material elevator 10, and after being weighed by the cold recycled material weighing hopper 8, they are conveyed to the mixing cylinder of the mixer 2.

The 20% to 50% of the new aggregates are heated to 200° C. through the hot recycled material drying drum 20, screened by a vibrating screen, and after being weighed according to the mix proportion, they enter the mixing cylinder of the mixer 2.

After stirring the hot recycled coarse materials, the warm recycled oil-rich fine aggregates, and the new aggregates in the mixing cylinder of the mixer 2 for a certain period of time, they are mixed and stirred with asphalt. The ex-factory temperature of the finished recycled asphalt mixture is between 140° C. and 180° C.

On the basis of the first Embodiment, the recycled coarse aggregates are separately heated by the hot recycled material drying drum 20 and then added. The total proportion of the recycled materials reaches 5000 to 80%. The recycled fine aggregates are preheated and added through a dedicated addition system, and the performance of the asphalt mixture is further improved.

Technical Indicators of the Asphalt Mixture Corresponding to Example 2

| Test Items | Unit | Technical Requirements | Measured Indicators |
| --- | --- | --- | --- |
| Dimensions of the Test Specimen | mm | φ101.6 mm × 63.5 mm | — |
| The number of compaction blows for Marshall test specimen (both sides) | time | 75 | — |
| Void ratio | % | 3~5 | 4.4 |
| Percentage of voids in mineral aggregate, not less than | % | 12.5 | 13.0 |
| Stability (MS), not less than | kN | 8 | 12.36 |
| Flow value (FL) | mm | 2~4.5 | 2.3 |
| Percentage of voids filled with asphalt (VFA) | % | 65~75 | 66.1 |
| Residual stability of the immersed Marshall test, not less than | % | 75 | 79.0 |
| Residual strength ratio of the freeze-thaw splitting test, not less than | % | 70 | 80.0 |
| Dynamic stability of rutting, not less than | time/mm | 800 | 3903 |
| Failure strain of the low-temperature bending test | µε | 2300 | 2550.5 |
| Asphalt-aggregate ratio | % | 4.5 | 4.5 |
| Asphalt-aggregate ratio of newly added asphalt | % | 3.0 | 3.0 |
| Mixing proportion of reclaimed asphalt pavement (RAP) material | % | — | 60 |

The Third Embodiment

A production process for factory-mixed warm and hot recycled asphalt mixture with a large proportion of recycled materials includes feeding 30% to 50% of the recycled coarse aggregates into the counterflow-heated hot recycled material drying drum 20 through the hot recycled material batching machine 19 and the belt conveyor, heating them to above 120° C. in the hot recycled material drying drum 20. The new aggregates are heated to 200° C. through the hot recycled material drying drum 20, screened by the vibrating screen, and after being weighed according to the mix proportion, they enter the mixing cylinder of the mixer 2.

The recycled coarse aggregates heated to 120° C. and the new aggregates heated to 200° C. simultaneously enter the mixing cylinder of the mixer 2, and part of the asphalt is added for pre-coating, and the 20% to 30% of the oil-rich fine aggregates are placed in the cold recycled material batching machine 16, conveyed to the cold recycled material heater 17 by a belt conveyor for preheating to 80° C., lifted to the cold recycled material temporary storage hopper 9 by the cold recycled material elevator 10, and after being weighed by the cold recycled material weighing hopper 8, they enter the cold recycled material mixer 7 for pre-mixing with the rejuvenator. The rejuvenator is added to the cold recycled material mixer 7 through the addition system.

Subsequently, all the aggregates are weighed according to the proportion, enter the mixing cylinder of the mixer 2 through the chute, and are mixed and stirred with the remaining asphalt to complete the mixing process. The ex-factory temperature of the finished recycled asphalt mixture is between 140° C. and 180° C.

On the basis of the mixing process of the recycled asphalt concrete in the second Embodiment, the pre-mixing process of the recycled fine aggregates and the rejuvenator is added, and the performance of the asphalt mixture is further improved. The total proportion of the recycled materials reaches 50% to 80%.

Figure 2:
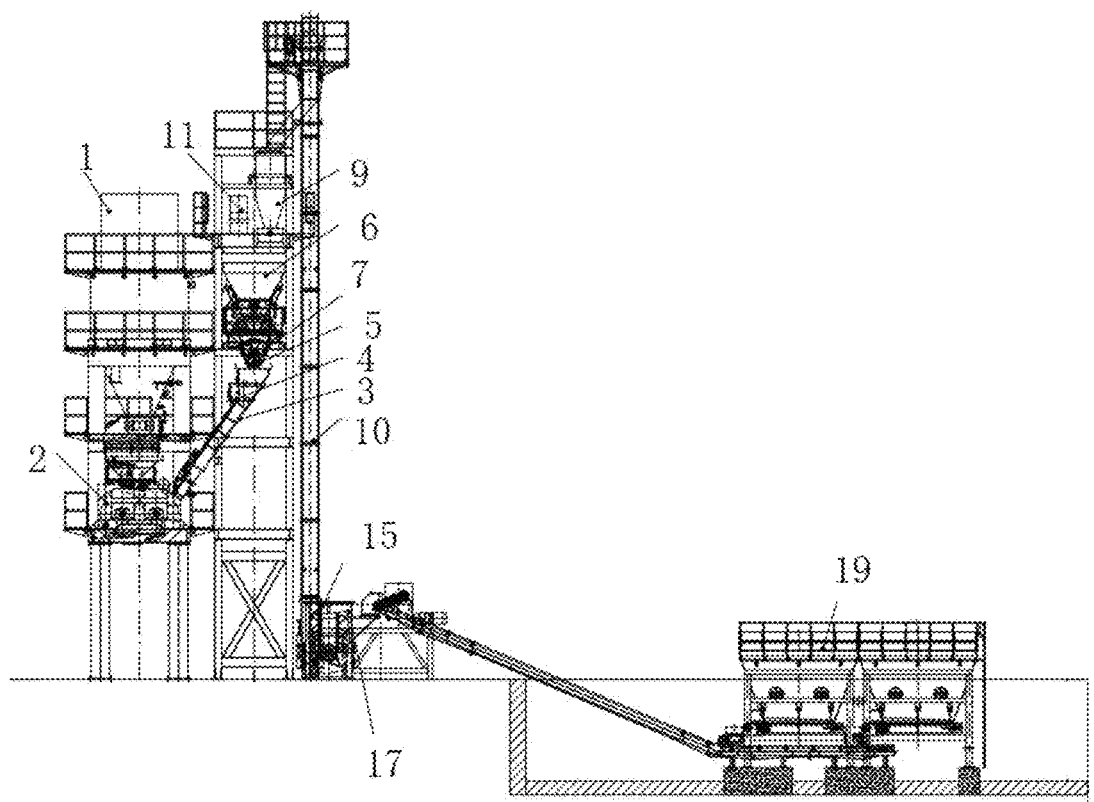
FIG. 2 is a schematic structural side view of the production equipment for factory-mixed warm and hot recycled asphalt mixture with a large proportion of recycled materials proposed by the present application.

Referring to FIGS. 1-2, a production equipment for factory-mixed warm and hot recycled asphalt mixture with a large proportion of recycled materials includes a mixer 2, a hot recycled material chute 3, a cold recycled material chute 4, a hot recycled material weighing hopper 5, a hot recycled material temporary storage hopper 6, a cold recycled material mixer 7, a cold recycled material weighing hopper 8, a cold recycled material temporary storage hopper 9, a cold recycled material elevator 10, a hot recycled material scraper conveyor 11, a rejuvenator platform 12, a first hot recycled material elevator 13, a flue gas treatment device 14, a second hot recycled material elevator 15, a cold recycled material heater 17, a combustion hot air system 18, and a hot recycled material drying drum 20 mounted in the region of the equipment building frame 1; and a cold recycled material batching machine 16 and a hot recycled material batching machine 19 provided on the ground.

The hot recycled material chute 3 and the cold recycled material chute 4 are respectively mounted above the mixer 2. The hot recycled material weighing hopper 5 and the hot recycled material temporary storage hopper 4 are sequentially mounted above the hot recycled material chute 3. The cold recycled material mixer 7, the cold recycled material weighing hopper 8, and the cold recycled material temporary storage hopper 9 are sequentially mounted above the cold recycled material chute 4.

The materials of the cold recycled material batching machine 16 are conveyed to the cold recycled material heater 17 through a conveyor belt. The cold recycled material heater 17 conveys the materials to the cold recycled material temporary storage hopper 9 through the cold recycled material elevator 10. The rejuvenator in the rejuvenator platform 12 is added to the cold recycled material mixer 7 through the addition system.

The hot recycled material drying drum 20 is provided between the second hot recycled material elevator 15 and the first hot recycled material elevator 13. The temperature of the hot recycled material drying drum 20 is controlled by the combustion hot air system 18. The outlet of the first hot recycled material elevator 13 is provided at the inlet of the hot recycled material scraper conveyor 11. The materials of the hot recycled material batching machine 19 are conveyed to the second hot recycled material elevator 15 through a conveyor belt.

Technical Indicators of the Asphalt Mixture Corresponding to Example 3

| Test Items | Unit | Technical Requirements | Measured Indicators |
| --- | --- | --- | --- |
| Dimensions of the Test Specimen | mm | φ101.6 mm × 63.5 mm | — |
| The number of compaction blows for Marshall test specimen (both sides) | time | 75 | — |
| Void ratio | % | 3~5 | 3.7 |
| Percentage of voids in mineral aggregate, not less than | % | 12.5 | 12.6 |
| Stability (MS), not less than | kN | 8 | 11.66 |
| Flow value (FL) | mm | 2~4.5 | 3.6 |
| Percentage of voids filled with asphalt (VFA) | % | 65~75 | 71 |
| Residual stability of the immersed Marshall test, not less than | % | 75 | 105 |
| Residual strength ratio of the freeze-thaw splitting test, not less than | % | 70 | 98 |
| Dynamic stability of rutting, not less than | time/mm | 800 | 4364 |
| Failure strain of the low-temperature bending test | με | 2300 | 2556 |
| Asphalt-aggregate ratio | % | 4.5 | 4.5 |
| Asphalt-aggregate ratio of newly added asphalt | % | 3.0 | 2.9 |
| Mixing proportion of reclaimed asphalt pavement (RAP) material | % | — | 75 |

The Fourth Embodiment

Figure 3:
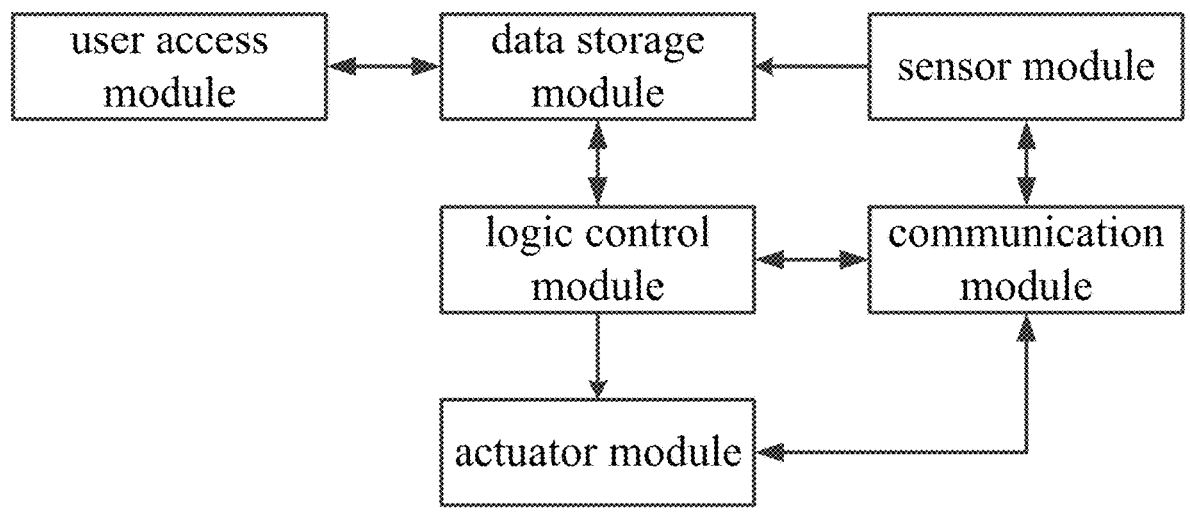
FIG. 3 is a schematic block diagram of the principle of the production system for factory-mixed warm and hot recycled asphalt mixture with a large proportion of recycled materials proposed by the present application.

Referring to FIG. 3, a production system for factory-mixed warm and hot recycled asphalt mixture with a large proportion of recycled materials includes a sensor module, a logic control module, and an actuator module;

the sensor module is configured to monitor in real time the temperature data of the cold recycled material heater 17 and the hot recycled material drying drum 20.

the logic control module is configured to receive the temperature data and pressure data and conduct real-time analysis and processing. Specifically:

the cold recycled material heater 17 includes several heating units. The heating temperature of the heating units is obtained, an average value of the heating temperatures of all the heating units to obtain a heating average value is calculated; a temperature monitoring time zone is set, and the heating average value at any collection moment within the temperature monitoring time zone is preprocessed, the preprocessing includes calculating the average value, variance, and range, and the preprocessed value is normalized to obtain a heating value JW1.

The temperature at a set position inside the hot recycled material drying drum 20 is obtained, and a temperature at any collection moment within the temperature monitoring time zone is preprocessed, and the preprocessed value to obtain a drum temperature value JW2 is normalized.

A weighted calculation of the heating value and the drum temperature value is performed with a formula $JW = JW1 \times w1 + JW2 \times w2$ to obtain the temperature adjustment value JW; w1 and w2 respectively represent weights of the heating value and the drum temperature value, and a set preheating temperature threshold group of the materials comprises thresholds Ja, Jb, and Jc.

The temperature adjustment value is compared with any threshold in the preheating temperature threshold group includes:

If $0 \leq JW < Ja$, generating a low-power heating signal;
If $Ja \leq JW < Jb$, generating a conventional heating signal;
If $Jb \leq JW < Jc$, generating a high-power heating signal;
marking the low-power heating signal, the conventional heating signal, and the high-power heating signal as the heating signal group;

using a formula: $Q = m \cdot c \cdot \Delta T$; calculating the heat energy required to heat the materials from a current temperature to a required temperature, and obtaining a mass flow rate, a specific heat capacity, and a temperature change of the materials; wherein Q represents the required heat energy, m represents the mass flow rate of the materials, c represents the specific heat capacity, and $\Delta T$ represents the difference between the current temperature and the required temperature; adjusting the required heat load according to the actual efficiency, and the formula is expressed as: $P = Q/\eta$, to obtain the required total power P; $\eta$ is a thermal efficiency of the heater;

obtaining a rated power p of any heating unit in the cold admixture heater 17;

calculating by a formula $ni = P/p \times ki$ according to the rated power and the total power, to obtain the determined number ni of heating units that need to be turned on; wherein k represents the weight coefficient of the corresponding heating signal in the heating signal group, and i represents the numbers of the low-power heating signal, the conventional heating signal, and the high-power heating signal, expressed as i=1, 2 or 3.

The actuator module is configured to dynamically control and adjust the heating units on the cold recycled material heater 17 according to the generated heating signal and the corresponding number of heating units to achieve the required heating effect.

The present application also includes a communication module, a user access module, and a data storage module.

The data storage module is configured to store the temperature data and the heating signals of the cold recycled material heater 17 and the hot recycled material drying drum 20, and the corresponding number of heating units.

The user access module is configured to access the information stored in the data storage module.

The communication module is configured to achieve data synchronization among the sensor module, the logic control module, and the actuator module.

Based on Tables 1 and 2 of the original biochemical technical indicators of the RAP aggregates provided in the first to fourth Embodiments.

TABLE 1

Specifications of RAP Recycled Aggregates (After Extraction)

| Specification Name | Nominal particle size (mm) | Mass percentage (%) passing through the following sieve apertures (mm) | | | | | | | | | | | |
|---|---|---|---|---|---|---|---|---|---|---|---|---|---|
| | | 37.5 | 31.5 | 26.5 | 19.0 | 13.2 | 9.5 | 4.75 | 2.36 | 1.18 | 0.6 | 0.3 | 0.15 | 0.075 |
| RS9 | 10~20 | — | — | 100 | 90~100 | — | 0~12 | 0~5 | — | — | — | — | — | — |
| RS10 | 10~15 | — | — | — | 100 | 90~100 | 0~12 | 0~5 | — | — | — | — | — | — |

| Specification Name | Nominal particle | Mass percentage (%) passing through the following sieve apertures (mm) | | | | | | | | | | | |
|---|---|---|---|---|---|---|---|---|---|---|---|---|---|
| RS12 | 5~10 | — | — | — | — | 100 | 90~100 | 0~15 | 0~5 | — | — | — | — |
| RS14 | 3~5 | — | — | — | — | — | 100 | 90~100 | 0~20 | — | 0~6 | — | — | — |
| RS15 | 0~5 | — | — | — | — | — | 100 | 90~100 | 60~90 | 40~75 | 20~55 | 7~40 | 2~20 | 0~10 |
| RS16 | 0~3 | — | — | — | — | — | — | 100 | 80~100 | 50~80 | 25~60 | 8~45 | 0~25 | 0~15 |

Table 2 Technical indicators for the original biochemical treatment of RAP aggregates

| Test Items | Unit | Technical Requirements | Testing Methods |
|---|---|---|---|
| Stone Crushing Value | % | ≤26 | JTGE42 T0316 |
| Apparent Relative Density | % | >2.60 | JTGE42 T0304 |
| Water Absorption Rate | % | ≤2.0 | JTGE42 T0304 |
| Soundness | % | ≤12 | JTGE42 T0314 |
| Content of Flaky and Elongated Particles | % | ≤15 | JTGE42 T0311 |
| Asphalt Content | % | >4.75 mm coarse aggregates ≤1.5 Measured value of fine aggregates | JTGE42 T0304 |
| Moisture Content | % | coarse aggregates ≤2.0 fine aggregates ≤3.0 | JTGE42 T0306 |
| Content of False Aggregates | % | ≥4.75 mm coarse aggregates ≤15 fine aggregates ≤20 | JTGE42 T0302 |
| Sand Equivalent of Fine Aggregates | % | ≥65 | JTG E42 T0334 |

The above are only the preferred specific implementation manners of the present application. However, the protection scope of the present application is not limited thereto. Any person skilled in the art, within the technical scope disclosed by the present application, making equivalent substitutions or changes according to the technical solutions and inventive concepts of the present application shall be covered within the protection scope of the present application.

What is claimed is:

1. A production process for factory-mixed warm and hot recycled asphalt mixture, wherein the production process is implemented by using a production equipment for factory-mixed warm and hot recycled asphalt mixture, wherein the production equipment of factory-mixed warm and hot recycled asphalt mixture, wherein the production equipment comprises a main mixer, a hot recycled material chute, a cold recycled material chute, a hot recycled material weighing hopper, a hot recycled material temporary storage hopper, a cold recycled material mixer, a cold admixture weighing hopper, a cold admixture temporary storage hopper, a cold recycled material elevator, a hot recycled material scraper conveyor, a rejuvenator platform, a first hot recycled material elevator, a flue gas treatment device, a second hot recycled material elevator, a cold admixture heater, a combustion hot air system, and a hot recycled material drying drum mounted in a region of an equipment building frame; and a cold admixture batching machine and a hot recycled material batching machine provided on a ground;

the hot recycled material chute and the cold recycled material chute are respectively mounted above the main mixer, and the hot recycled material weighing hopper and the hot recycled material temporary storage hopper are sequentially mounted above the hot recycled material chute, and the cold recycled material mixer, the cold admixture weighing hopper and the cold admixture temporary storage hopper are sequentially mounted above the cold recycled material chute;

materials of the cold admixture batching machine are conveyed to the cold admixture heater through a conveyor belt, and the cold admixture heater conveys the materials to the cold admixture temporary storage hopper through the cold recycled material elevator, and the rejuvenator in the rejuvenator platform is added to the cold recycled material mixer through an addition system;

the hot recycled material drying drum is provided between the second hot recycled material elevator and the first hot recycled material elevator, a temperature of the hot recycled material drying drum is controlled by the combustion hot air system, and an outlet of the first hot recycled material elevator is provided at the inlet of the hot recycled material scraper conveyor, and the materials of the hot recycled material batching machine are conveyed to the second hot recycled material elevator through a conveyor belt, and the cold admixture heater comprises heating units;

the process comprises:

heating 30% to 50% of recycled coarse aggregates in the hot recycled material drying drum to above 120° C., and preheating 20% to 30% of recycled oil-rich fine aggregates to 80° C. and mixing and stirring the recycled coarse aggregates and the recycled oil-rich fine aggregates with new aggregates;

feeding 30% to 50% of the recycled coarse aggregates into the counterflow-heated hot recycled material drying drum through the hot recycled material batching machine and a belt conveyor, and heating to above 120° C. in the hot recycled material drying drum, lifting to the hot recycled material scraper conveyor through the first hot recycled material elevator, and conveying to the hot recycled material temporary storage hopper through the hot recycled material scraper conveyor, and entering a mixing cylinder of the main mixer through the chute after weighing by the weighing system according to a mix proportion;

placing 20% to 30% of the recycled oil-rich fine aggregates in the cold admixture batching machine, conveying to the cold admixture heater through a belt conveyor for preheating to 80° C., lifting to the cold admixture temporary storage hopper of the cold recycled material through the cold recycled material elevator, and conveying to the recycled material mixer and then enter the mixing cylinder of the main mixer after weighing by the cold admixture weighing hopper;

heating 20% to 50% of the new aggregates to 200° C. through the hot recycled material drying drum, screening through a vibrating screen, and entering the mixing cylinder of the main mixer after weighing according to the mix proportion; and after stirring the hot recycled coarse materials, the warm recycled oil-rich fine aggregates, and the new aggregates in the mixing cylinder of the main mixer for a certain time, stirring with an asphalt binder to produce a finished product of the recycled asphalt mixture;

when the addition amount of the recycled materials is 50% to 60%, a hot mixing method is adopted, and when it is greater than 60%, a warm mixing method is adopted.

2. The production process for factory-mixed warm and hot recycled asphalt mixture according to claim 1, wherein the recycled materials are recovered from an old asphalt mixture pavement materials by milling or mechanical excavation, and are finely separated through the processes of dust removal, flexible dispersing, primary screening, primary crushing, secondary crushing, asphalt film removal, and fine screening;

one kind of fine aggregate is obtained through the primary screening, and 3 to 5 kinds of coarse aggregates and one kind of oil-rich fine aggregate are obtained through the fine screening.

3. A production process for factory-mixed warm and hot recycled asphalt mixture, wherein the production process is implemented by using the production equipment for factory-mixed warm and hot recycled asphalt mixture, wherein the production equipment of factory-mixed warm and hot recycled asphalt mixture, wherein the production equipment comprises a main mixer, a hot recycled material chute, a cold recycled material chute, a hot recycled material weighing hopper, a hot recycled material temporary storage hopper, a cold recycled material mixer, a cold admixture weighing hopper, a cold admixture temporary storage hopper, a cold recycled material elevator, a hot recycled material scraper conveyor, a rejuvenator platform, a first hot recycled material elevator, a flue gas treatment device, a second hot recycled material elevator, a cold admixture heater, a combustion hot air system, and a hot recycled material drying drum mounted in a region of an equipment building frame; and a cold admixture batching machine and a hot recycled material batching machine provided on a ground;

the hot recycled material chute and the cold recycled material chute are respectively mounted above the main mixer, and the hot recycled material weighing hopper and the hot recycled material temporary storage hopper are sequentially mounted above the hot recycled material chute, and the cold recycled material mixer, the cold admixture weighing hopper and the cold admixture temporary storage hopper are sequentially mounted above the cold recycled material chute;

materials of the cold admixture batching machine are conveyed to the cold admixture heater through a conveyor belt, and the cold admixture heater conveys the materials to the cold admixture temporary storage hopper through the cold recycled material elevator, and the rejuvenator in the rejuvenator platform is added to the cold recycled material mixer through an addition system:

the hot recycled material drying drum is provided between the second hot recycled material elevator and the first hot recycled material elevator, a temperature of the hot recycled material drying drum is controlled by the combustion hot air system, and an outlet of the first hot recycled material elevator is provided at the inlet of the hot recycled material scraper conveyor, and the materials of the hot recycled material batching machine are conveyed to the second hot recycled material elevator through a conveyor belt, and the cold admixture heater comprises heating units:

the process comprises:

feeding 30% to 50% of the recycled coarse aggregates into the counterflow-heated hot recycled material drying drum through the hot recycled material batching machine and a belt conveyor, and heating to above 120° C. in the hot recycled material drying drum, and heating the new aggregates to 200° C. through the hot recycled material drying drum, screening through a vibrating screen, and entering the mixing cylinder of the main mixer after weighing according to a mix proportion;

the recycled coarse aggregates heated to 120° C. and the new aggregates heated to 200° C. entering the mixing cylinder of the main mixer synchronously and add part of the asphalt for pre-coating;

placing 20% to 30% of recycled oil-rich fine aggregates in the cold admixture batching machine, conveying to the cold admixture heater through a belt conveyor for preheating to 80° C., lifting to the cold admixture temporary storage hopper through the elevator, and entering the recycled material mixer for pre-mixing with the rejuvenator after weighing by the cold admixture weighing hopper;

subsequently, after all the aggregates are weighed according to the proportion, entering the mixing cylinder of the main mixer through a chute, and being mixed with a remaining asphalt binder to complete the mixing process and produce the finished product of the recycled asphalt mixture;

when the addition amount of the recycled materials is 50% to 60%, a hot mixing method is adopted, and when it is greater than 60%, a warm mixing method is adopted.

* * * * *